May 12, 1936.    J. L. SHROYER    2,040,675
BAKE OVEN
Filed Jan. 10, 1934
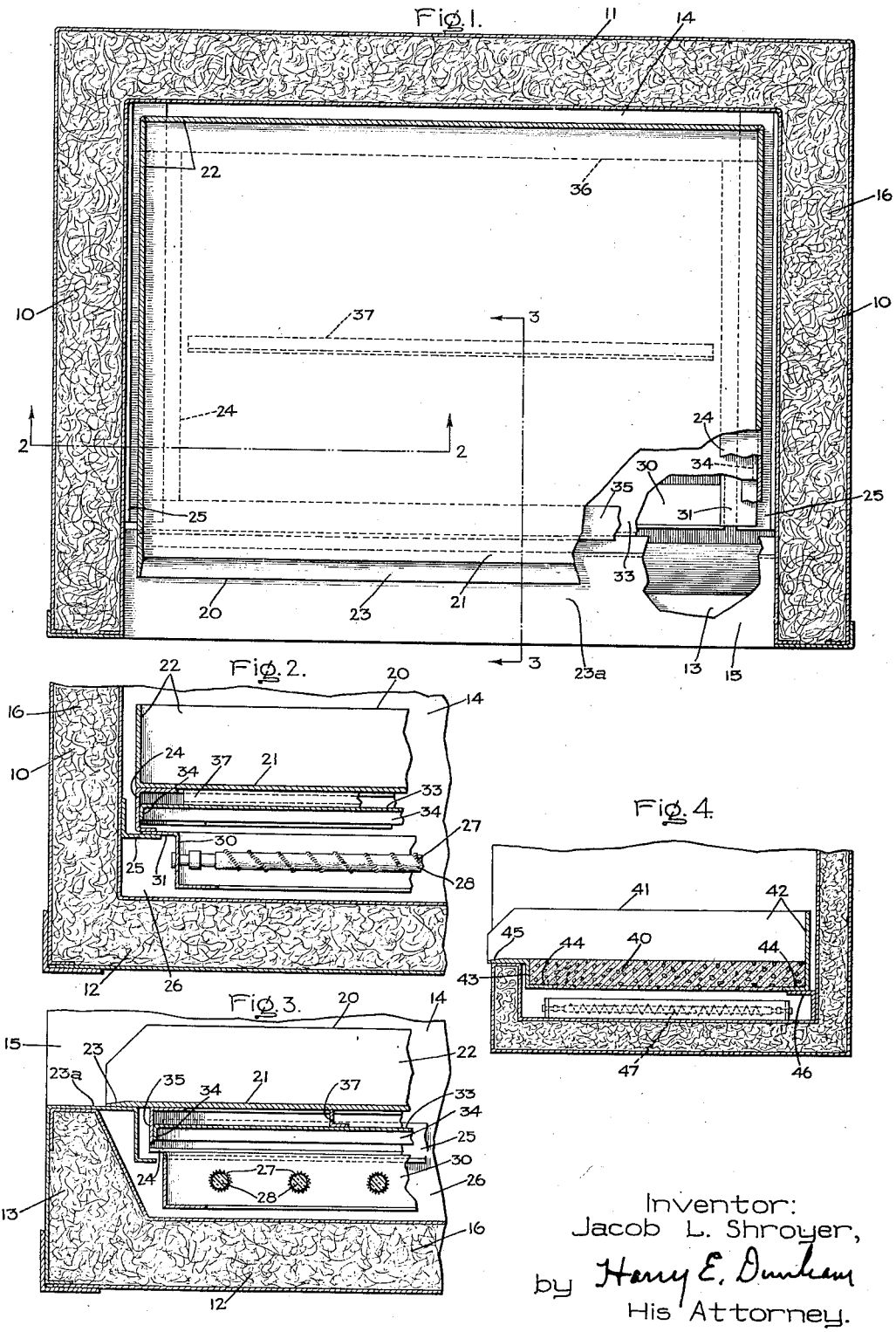
Inventor:
Jacob L. Shroyer,
by Harry E. Dunham
His Attorney.

Patented May 12, 1936

2,040,675

UNITED STATES PATENT OFFICE 2,040,675

BAKE OVEN

Jacob L. Shroyer, Oak Park, Ill., assignor to Edison General Electric Appliance Company, Chicago, Ill., a corporation of New York Application January 10, 1934, Serial No. 706,083

6 Claims. (Cl. 219—35)

This invention relates to bake ovens, more particularly to electrically heated ovens for baking pies, breads, pastries, etc., and it has for its object the provision of an improved oven of this character which is more efficient in its operation and considerably cheaper in its construction than the ovens heretofore generally known.

The ovens heretofore commonly used for baking pies, etc., are provided with tile baking decks beneath which heat generating elements are located. The decks have been a source of trouble due to liquids which are spilled on the decks frequently leaking through or around the decks into the heating unit chamber below where they contact the heating units and cause "grounds" and burned out units.

Up to this time only decks of a very high quality refractory tile have given fairly satisfactory results. These decks are made of a large number of relatively small pieces of tile cemented together and to the linings of the oven walls surrounding the decks. Decks of this character are very expensive to make, and even then are not completely satisfactory. The binding cement between the tiles and between the tiles and the oven lining becomes loosened and cracks up after a year or two of service and the decks require frequent recementing thereafter. The cracks in the binding cement, unless repaired immediately, form paths through which liquids spilled on the deck pass to the heating element chamber below.

Moreover, the surface of the tile deck roughens more or less with use, and it is difficult to keep it free from carbonized materials, such as grease, lard, etc., which spill on the deck and partially burn. These deposits become a source of objectionable odors.

My invention contemplates the provision of an improved deck construction which obviates these disadvantages of the prior decks. Thus, in one of its aspects, my invention contemplates the provision of a liquid impervious bake oven deck which will protect the heating units arranged below the deck against damage due to liquids which may be spilled on the deck. It is contemplated that the deck may even be washed or scrubbed with water without danger of the water reaching the heating units below. It is a further object of this invention to provide an inexpensive rugged deck and one having a smooth level baking surface.

In accordance with my invention, the deck consists of a metallic framework having a plain surface baking deck, and upright marginal walls at the rear and sides of the deck extending considerably above the baking surface. The front of the baking deck is provided with a flange lying in the plane of the baking surface and projecting through the doorway of the oven out over its threshold. The framework preferably will be formed of steel. The upright marginal walls and the flange at the front may be formed of the same material, and preferably will be formed integrally with the baking deck.

The framework is supported in an elevated position so as to provide a space below for suitable heating elements.

In order to control the flow of heat to the heating chamber through the baking surface and to secure an even distribution of heat over this baking surface, I provide a wall below the baking surface arranged in parallel and spaced relation with it. In another form of my invention, I accomplish this by covering the baking surface with a layer of suitable "composition", such as concrete.

For a more complete understanding of my invention, reference should be had to the accompanying drawing in which Fig. 1 is a horizontal sectional view of an electrically heated bake oven embodying my invention, portions being broken away so as to illustrate certain details of construction; Fig. 2 is a fragmentary vertical sectional view taken through the line 2—2 of Fig. 1 and looking in the direction of the arrows; Fig. 3 is a fragmentary vertical sectional view taken through the line 3—3 of Fig. 1 and looking in the direction of the arrows; and Fig. 4 is a vertical sectional view of an oven of modified form arranged in accordance with my invention.

Referring to Figs. 1 to 3, I have shown my invention as applied to an electrically heated bake oven comprising a pair of side walls 10, a rear wall 11, a bottom wall 12, a relatively low front wall 13 and a top wall (not shown) defining a rectangular heating chamber 14 having a charging and discharging opening 15 at the front thereof. It will be understood that this front opening will be provided with a suitable door which has not been shown, because it forms no part of the present invention. The walls of the oven preferably will be formed of inner and outer linings arranged in spaced relation with each other, as clearly shown in the drawing. The space between the linings is filled with a suitable heat insulating material 16, such as rock wool.

The oven deck, in accordance with my invention, consists of a metallic framework 20 which has a plain surface baking deck 21. This deck, as shown, has an area substantially equal to the horizontal cross-sectional area of the heating chamber 14. The deck will be formed of a suitable material, such as steel.

The framework further comprises an upright marginal wall 22 at the rear and sides of the deck that extend considerably above the baking surface, as clearly shown in Figs. 2 and 3.

The front of the baking deck is provided with a lip or flange 23 which projects through the front door opening 15 out over the threshold 23a of the door. This threshold, as shown, projects into the heating chamber somewhat and it is upon the inwardly projecting portion of the threshold that the lip 23 rests.

The wall 22 and the flange 23 preferably will be formed integrally with the baking surface 21. This may be accomplished by turning the sides and rear edges of a suitably shaped metal plate upwardly and then welding the side walls to the rear walls where the walls meet at the corners. The flange 23 preferably will be and as shown is formed as a continuation of the surface 21 directed out through the doorway.

The framework 20 is supported in an elevated position in the oven chamber so that its baking surface 21 lies in a plane parallel with the bottom wall of the oven and at a height substantially equal to the height of the front wall 13 at the inside of the oven. As shown, the framework is supported upon a suitable metallic base consisting of a pair of metallic supports 24 arranged at the sides of the oven and longitudinally thereof. Each of these members is of distorted U-shape, as shown in Fig. 2, the upper leg upon which the framework rests being slightly longer than the lower leg. The framework is secured to the members 24 in any suitable manner, such as by spot welds.

The lower legs of the supports 24 are supported by a pair of metallic brackets 25 extending longitudinally of the heating chamber from its front to its rear wall. These brackets may be welded or riveted to the inner side walls of the oven.

It will be understood that the brackets 25 will be positioned so as to support the framework at such an elevation that a space 26 will be provided below the framework having such proportions that it will readily accommodate suitable heating means below the oven deck.

The heating means consists in a plurality of sinuous resistance elements 27 wound spirally upon suitable electrically insulating supporting rods 28. These rods in turn are supported within a casing or base 30 provided with flanges 31 at the sides which rest directly on the brackets 25. The members 24 supporting the deck 21, rest directly on the flange 31, as shown in Fig. 2.

In order to control the rate of heat transfer through the baking surface 21 and to provide an even distribution of heat over the baking surface, that is, in order to prevent areas of excessive localized heat, I have provided below the baking surface 21 a wall 33 having an area substantially equal to the area of the baking surface and supported in spaced and substantially parallel relation with the baking surface, as clearly shown in Figs. 2 and 3. The wall 33 is supported by means of the framework 20 and its supporting members 24. For this purpose, the wall 33 is provided at its front, side and rear edges with a depending flange 34. The flanges 34 at the sides bear against the inner walls of the supporting members 24 to which they are secured in any suitable manner, as by spot welds. The flange 34 at the front is secured to a flange 35 extending across the bottom of the surface 21. The flanges 34 and 35 are secured together and the flange 35 to the baking surface in any suitable manner, as by spot welds. The flange 34 at the rear (not shown) is secured to a flange 36 similar to the flange 35 at the front. The central portion of the wall 33 is secured in its spaced position with respect to the baking surface by means of an angle bar 37 arranged transversely of the heating chamber between these members. The angle member 37 is secured to the backing deck and to the wall 33 by spot welds.

The framework comprising the baking surface 21, the up-right marginal walls 22 at the back and sides of the baking surface 21 and the projecting flange or lip 23 at the front prevent liquids that are spilled on the surface 21 from reaching the heating unit compartment 26 below. It is even possible to pour water onto the deck for purposes of cleaning it. It will be observed that any liquids that are spilled on the deck will necessarily run out of the front opening 15 in such a way that they can not possibly gravitate to the heating compartment below the deck.

In addition to this, it has been found that my steel deck retains its smooth even baking surface. The baking surface does not warp or roughen with use. Because of this, it is highly unlikely that spilled materials will form carbonized deposits which cannot be removed by ordinary cleaning processes.

It is also to be noted that my bake oven deck has a very rigid and comparatively simple and inexpensive construction. The frame 20 is rigidly secured to its supporting members 24 and to the heat distribution wall 33 so as to form a composite integral structure, which for all practical purposes is indestructible. This metallic oven deck, moreover, is far cheaper to make than the tile decks heretofore generally used.

If desired, the oven deck can be easily removed from the heating chamber by sliding it forwardly on the brackets 25 through the front opening 15. Likewise, the heating unit can be readily removed through the opening 15.

The provision of the spaced walls 21 and 33 provide an even distribution of heat over the baking surface 21. Moreover, this construction controls the flow of heat so as to prevent a too rapid transfer of heat from the heating unit to the product being baked. This arrangement of the oven deck provides substantially the thermal characteristics of the tile ovens which have been used heretofore.

In Fig. 4 I have shown a deck arranged in general as is the deck of Figs. 1 to 3. In Fig. 4, however, I have substituted a "composition" layer for the double wall construction between the heating unit and the product being baked.

As shown in Fig. 4, the oven deck of this form of my invention comprises a composition baking deck 40 supported in a metallic framework 41. The deck 40 may be formed of a suitable concrete or other suitable liquid-impervious substance capable of withstanding the high temperatures encountered in the oven.

The framework 41 is provided with side and rear walls 42, and at the front with a relatively short wall 43. The walls 42 and 43 at their lower edges are provided with inturned flanges 44 which support the deck 40, as clearly shown in Fig. 4.

The height of the front wall is equal to the thickness of the deck 40, and is provided at the top with a horizontal flange or lip 45 arranged to project through the front door of the oven, as shown in Fig. 4. The upper surface of the flange is flush with the baking surface of the deck 40.

The side and end walls 42 extend vertically above the baking surface, as do the walls 22 of Figs. 1 to 3.

The frame 41 is supported at the front by the lip 45 which rests in the front wall of the oven and at the rear on a bracket 46.

Beneath the deck is arranged a suitable electric heating unit 47.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An oven comprising walls defining a heating chamber having an opening therein arranged so that its threshold is above the bottom of said chamber a metallic baking deck in said chamber provided with upright walls at the sides and rear thereof and a lip at the front projecting through said opening over said threshold, supports within said heating chamber slidably receiving said deck whereby it can be readily removed from and inserted in said heating chamber and an electrical heating unit separate from said deck within said chamber below the level of said threshold slidably mounted on said supports so that it can be readily removed from and inserted in said heating chamber.

2. An oven comprising walls defining a heating chamber having a charging and discharging opening in the front thereof arranged with its threshold above the bottom of said oven, a metallic framework in said chamber forming a plane surface baking deck having upright marginal side and rear walls formed integrally with said deck and a lip at the front formed integrally with said deck, a plurality of metallic brackets in said heating chamber slidably receiving said deck in an elevated position in said chamber so that said lip projects through said threshold and so as to provide a heating compartment beneath said deck, and an electrical heating element within said compartment below said deck arranged to apply heat to said baking surface.

3. An electrically heated bake oven comprising walls defining a heating chamber having a front charging and discharging opening therein positioned so that its threshold is above the bottom of said chamber, a rigid deck structure within said chamber comprising a metallic wall defining a plain surface baking deck, an upright marginal metallic wall at the sides and rear of said deck formed integrally with said deck, a metallic lip at the front of said deck formed integrally with said deck substantially in the plane of said deck and arranged to project through said front opening over its threshold, a plurality of metallic supporting members below said deck arranged longitudinally thereof at its sides and united into a unitary structure with it, a metallic wall having substantially the area of said baking deck arranged beneath said deck in parallel spaced relation with it, means uniting said wall into a unitary structure with said deck and said supporting members, a pair of brackets at the sides of said oven below said threshold slidably receiving said deck structure to support said deck substantially at the level of said threshold and so that said lip projects through said opening over said threshold, and a heating unit separate from said deck slidably mounted on said brackets below said deck.

4. An oven comprising walls defining a heating chamber having a front opening therein above the bottom of said chamber, a metallic framework within said chamber provided with upright walls at the sides and rear thereof and a lip at the front, a liquid impervious baking deck supported by said framework within said walls so that its baking surface is substantially flush with said lip and is materially below the top of said walls, means in said chamber supporting said framework with its baking surface substantially at the level of said threshold and so that said lip projects through said opening over said threshold, heating means below said deck and means controlling the flow of heat from said heating means to the baking surface of said deck so as to provide a substantially even distribution of heat over said baking surface.

5. An oven comprising walls defining a heating chamber having an opening therein, a metallic framework in said chamber provided with upright walls at the sides and rear thereof and a lip at the front projecting through said opening and a liquid-impervious composition baking deck supported by said framework within said walls so that its upper surface is substantially flush with said lip and is materially below the top of said walls.

6. An electrically heated baking oven comprising walls defining a heating chamber having a front charging and discharging opening therein and a rigid metallic deck structure within said chamber comprising a metallic wall defining a plain surface baking deck, an up-right marginal metallic wall at the sides and rear of said deck formed integrally with said deck, a metallic lip at the front of said deck formed integrally with said deck substantially in the plane of said deck and arranged to project through said front opening over its threshold, a plurality of metallic supporting members below said deck arranged longitudinally thereof at its sides and united into a unitary structure with it, a metallic wall having substantially the area of said baking deck arranged beneath said deck in parallel spaced relation with it, means uniting said wall into a unitary structure with said deck and said supporting members, a pair of metallic brackets within said oven at the sides arranged to slidably receive said supporting members so as to support said deck in working position in said heating chamber and a heating unit separate from said deck mounted on said brackets below said deck.

JACOB L. SHROYER.